United States Patent [19]
Moatti

[11] 3,944,488
[45] Mar. 16, 1976

[54] SELF-CLEANING FILTER WITH MOTOR INCORPORATED THEREWITH

[76] Inventor: Samuel Georges Moatti, 17, rue Gutemburg, Boulogne (Hauts-de-Seine), France

[22] Filed: Mar. 18, 1974

[21] Appl. No.: 452,407

Related U.S. Application Data

[63] Continuation of Ser. No. 253,858, May 16, 1972, abandoned.

[30] Foreign Application Priority Data

May 19, 1971 France .............................. 71.18275

[52] U.S. Cl. .............. 210/108; 210/333 R; 210/345; 210/405
[51] Int. Cl.² ......................................... B01D 29/38
[58] Field of Search ........... 210/101, 107, 108, 330, 210/332, 333, 343, 345, 346, 405, 408–412

[56] References Cited
UNITED STATES PATENTS

| | | |
|---|---|---|
| 3,283,903 | 11/1966 | Muller ................................ 210/108 |
| 3,388,799 | 6/1968 | Rymer ........................... 210/108 X |
| 3,493,113 | 2/1970 | Rosaen ............................... 210/108 |
| 3,608,722 | 9/1971 | Picard................................. 210/108 |
| 3,717,252 | 2/1973 | Picard................................. 210/108 |

*Primary Examiner*—Charles N. Hart
*Assistant Examiner*—Robert H. Spitzer
*Attorney, Agent, or Firm*—Marn & Jangarathis

[57] ABSTRACT

This invention relates to a self-cleaning filter formed of an assembly of filtering elements fed in parallel, a rotary distributor enabling the feed of a series of filtration chambers to be cut off, wherein the distributor is driven by a hydraulic motor functioning under the pressure of the liquid filtered or to be filtered.

9 Claims, 9 Drawing Figures

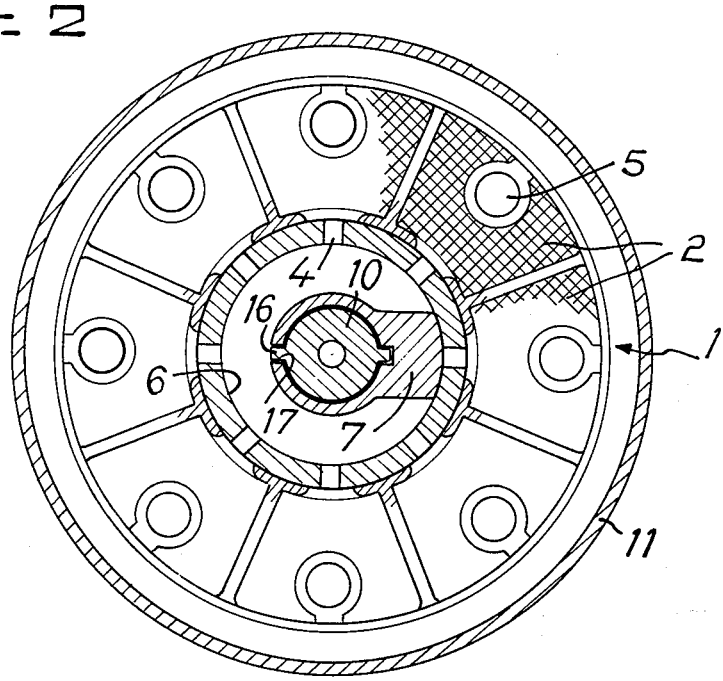
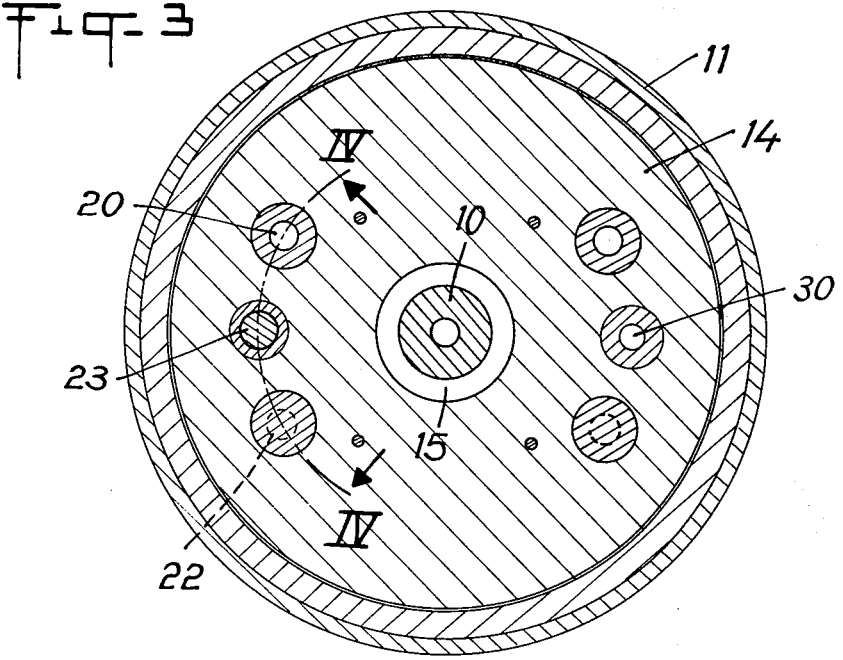

SELF-CLEANING FILTER WITH MOTOR INCORPORATED THEREWITH

This is a continuation of application Ser. No. 253,858, filed May 16, 1972; now abandoned.

The present invention relates to a self-cleaning filter with motor incorporated therewith.

It relates to filters formed of a plurality of filtering devices fed in parallel, a distributor enabling a series of filters to be fed in counter-current for washing and cleaning the filtering walls.

This distributor is generally connected to an outside control device or distributor motor which periodically switches the feed of the filtering chambers. As this motor is independent of the filtration circuit, there is a risk of the filter clogging if the motor stops, and, moreover, there is not a complete filtering assembly ready to be connected by simple interposition on the circuit of the fluid to be filtered.

It is an object of the invention to provide a self-cleaning filter which may be directly connected in the fluid filtering circuit without any subjection other than having to adapt the dimensions of the filter to the output of fluid.

The invention therefore has for its object a self-cleaning filter formed of an assembly of filtering elements fed in parallel, a rotary distributor allowing the feed of a series of filtering chambers to be cut off, characterised in that the distributor is driven by a hydraulic motor functioning under the pressure of the liquid filtered or to be filtered.

The invention will be more readily understood upon reading the following description with reference to the accompanying drawings, in which:

FIG. 2 is a section along line II—II of FIG. 1.

FIG. 3 is a section along III—III of FIG. 1.

Figure 1:
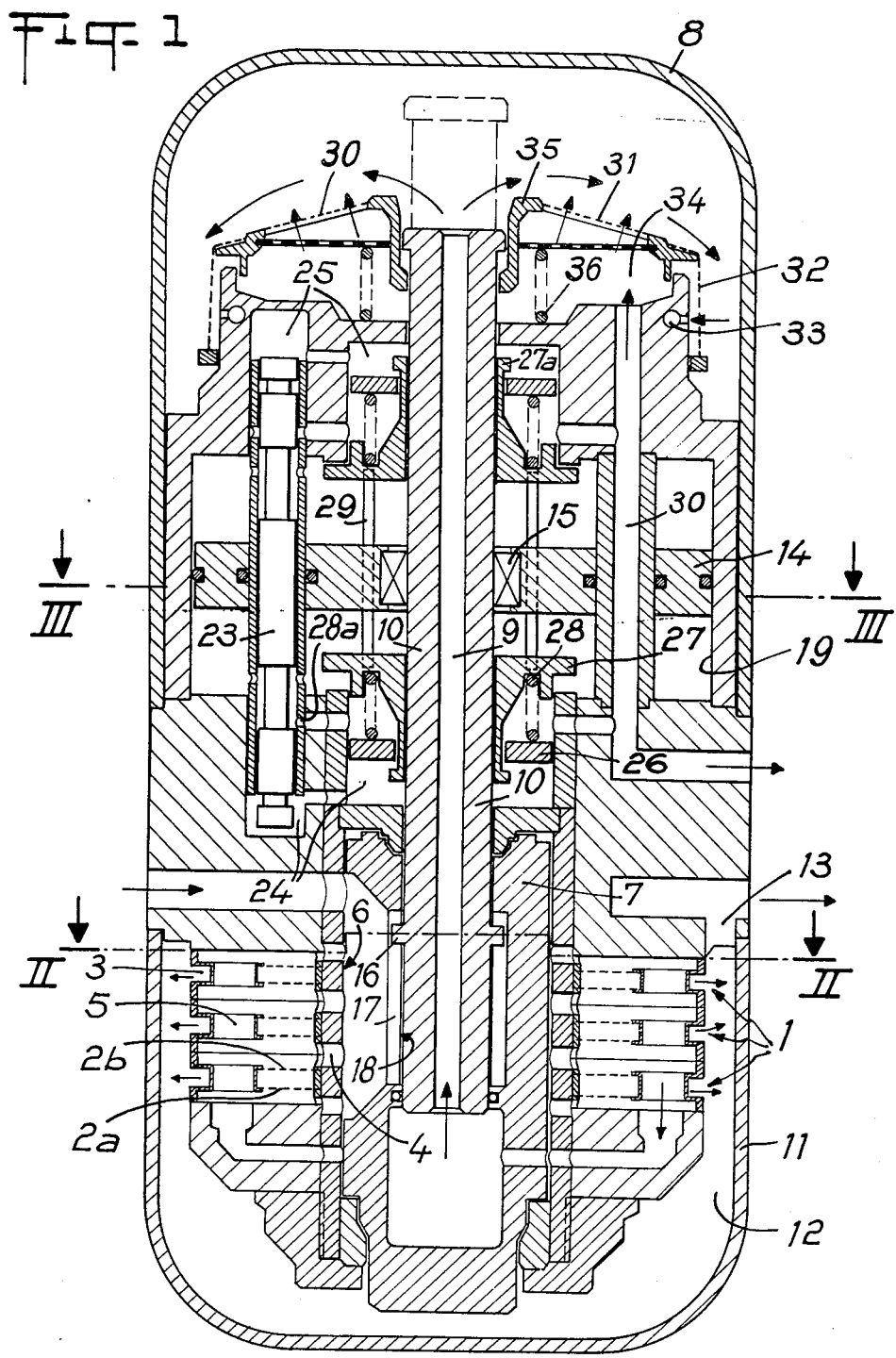
FIG. 1 is an axial section of a self-cleaning filter according to the invention.
Figure 4:
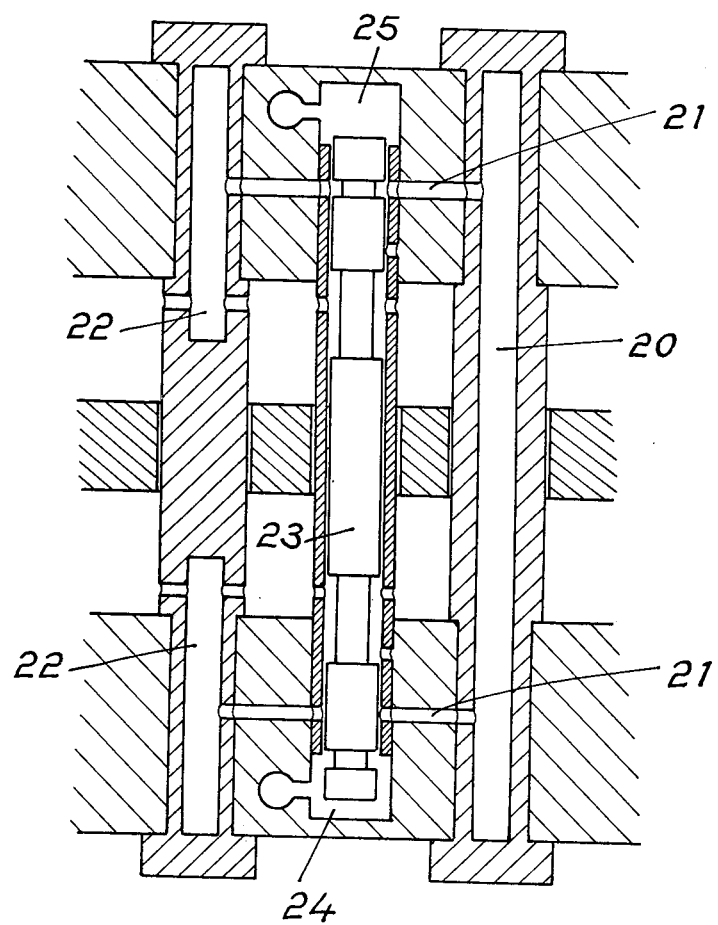
FIG. 4 is a section along IV—IV of FIG. 1.
Figure 5:
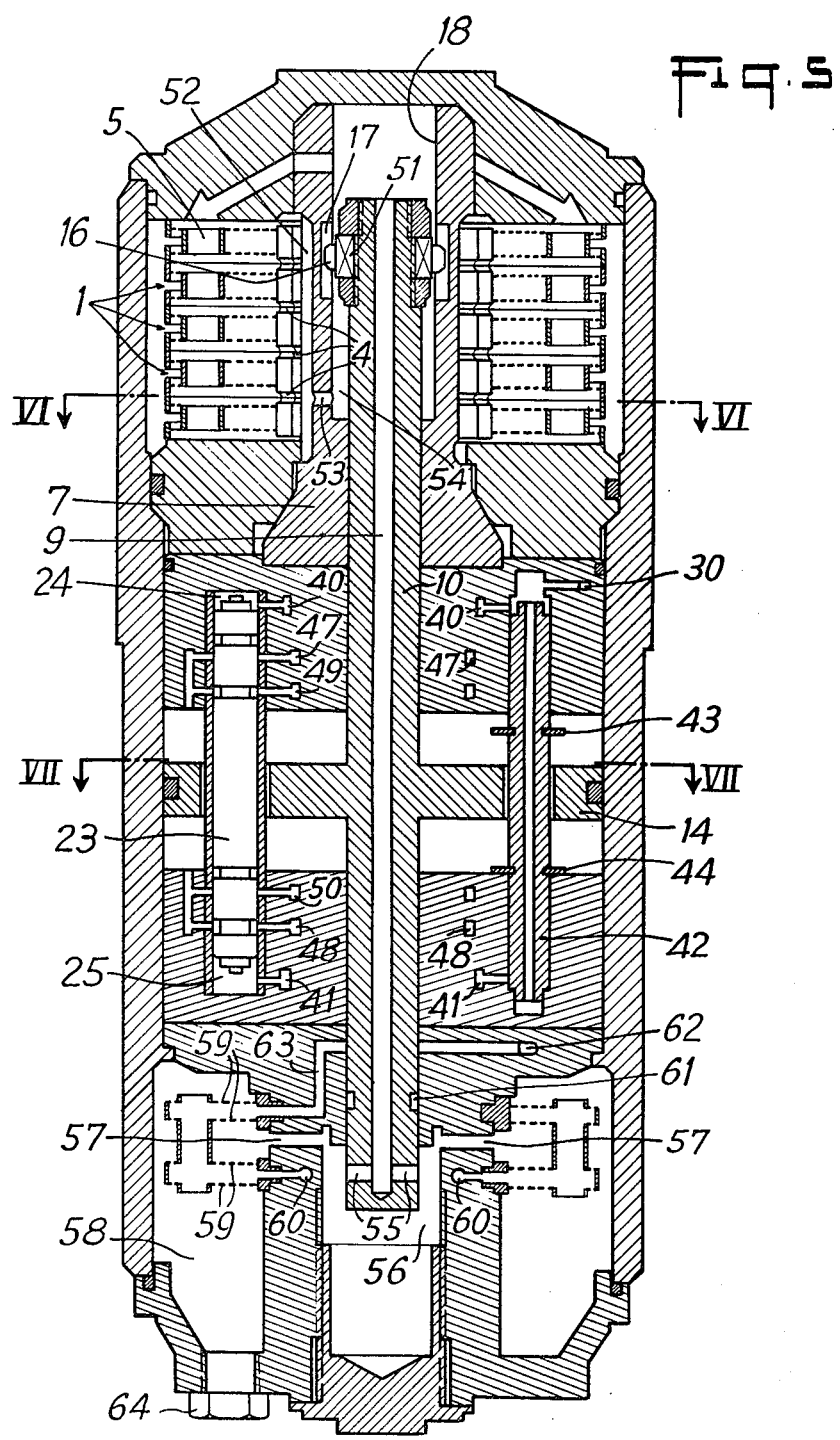
FIG. 5 is an axial section of a variant embodiment of a self-cleaning filter according to the invention.
Figure 6:
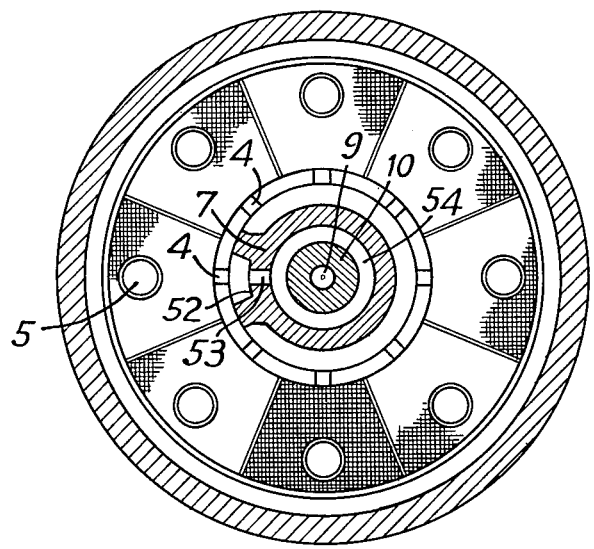
FIG. 6 is a section along VI—VI of FIG. 5.
Figure 7:
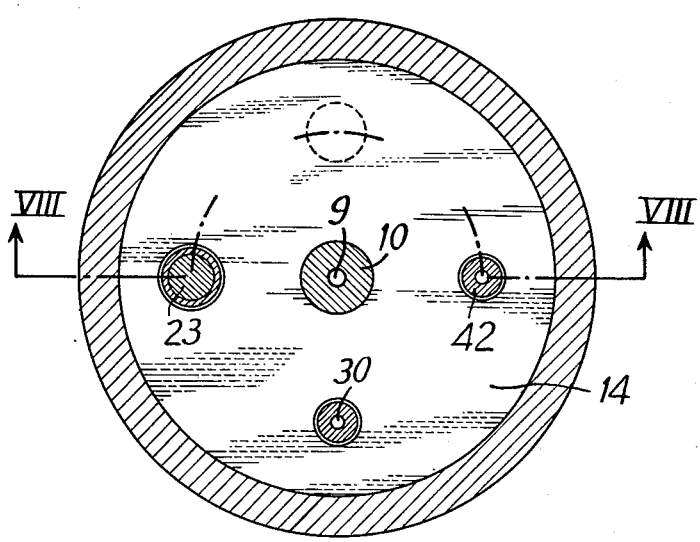
FIG. 7 is a section along VII—VII of FIG. 5.
Figure 8:
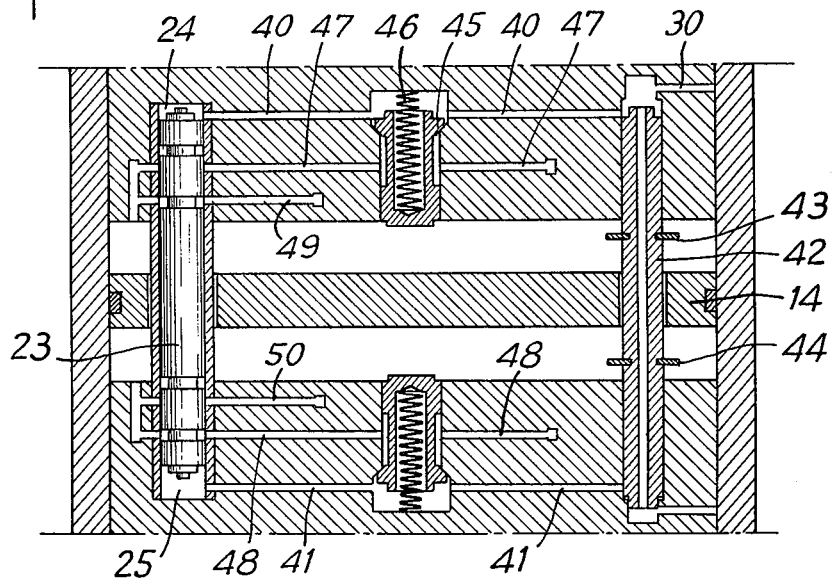
FIG. 8 is a section along VIII—VIII of FIG. 5.

According to the invention, and referring to FIGS. 1–4, the filter is composed of three parts: the actual filter, the drive motor of the distributor and the device for collecting the impurities from the filter.

The actual filter is constituted of a stack of a plurality of filtering elements 1 of discoidal form and comprising eight independent chambers 2 defined by two filtering gauzes 2a, 2b and each having an outlet orifice 3, an inlet passage 4 and a return conduit 5 for cleaning in countercurrent. The passages 4 of the eight chambers open onto a central passage 6 where the fluid to be filtered, oil for example, arrives.

A rotary obturator 7 allows the eight inlet passages 4 to be successively closed, thus cleaning in counter-current the filtering gauzes of each chamber, the cleaning oil being sent towards the device for collecting the impurities, enclosed in a casing 8 into which the cleaning oil arrives through an axial conduit 9 made in the control rod 10 of the obturator 7.

The assembly of filtering elements is covered by a cover 11 which defines a chamber 12 for collecting filtered oil, from where the latter is sent through a conduit 13 towards the load-circuit.

The rod 10 is the driven member of the drive motor of the distributor which is in fact a hydraulic motor coupled to the filter and functioning under the pressure of the filtered oil.

This motor operates in the manner of a double-action jack, the rod 10 which is animated by an axial to and fro movement is connected to a drive piston 14 by the intermediary of a free wheel 15 which allows it to rotate in one direction so as to drive the obturator 7 always in the same direction thanks to a stop 16 of the rod which is engaged in a helical groove 17 made in an axial passage 18 of the obturator through which the rod 10 slides, which is subjected to the action of a non-return catch (not shown) preventing it from rotating in one direction.

The drive piston 14 moves in a chamber 19 and each of its faces is subjected alternatively to the pressure of the filtered oil which is introduced through a conduit 20 which passes through the piston 14 and feeds the chamber 19 through feed passages 21 and orifices 22 on whose path is placed a piston or distributor slide 23 switching the feed from one side to the other of the piston.

The two ends of this distributor piston 23 plunge into chambers 24 and 25 filled with oil and closed by annular pistons 26 through which the rod 10 slides.

This piston 26 is mounted on a slide 27 which rests thereon by means of a spring 28 whilst connecting bars 29 which pass through the piston 14 connect the two slides 27.

At the end of stroke, the piston 14 touches and pushes the slide 27, which drives the piston 26 into the chamber 24 for example, whilst the contrary movement is effected for the chamber 25, slide 27 driving the piston 26 by an annular projection 27a.

The pressure of the fluid therefore increases in the chamber 24 and reduces in chamber 25, the piston 23 is then pushed out of chamber 24 and penetrates into chamber 25, this switching the feed of chamber 19 to the other face of the drive piston 14.

The reverse movement is then produced until the piston 14 drives piston 26 from chamber 25.

Furthermore, it will be noted that the distributor piston 23 which opens the feed on one of the faces also opens the evacuation passage 28a of chamber 19 on the side of the other face, which passage leads to an evacuation collector 30.

The washing fluid which arrives in the casing 8 contains impurities which are deposited on the filtering gauzes 31 and are retained by a gauze 32 whilst the purified fluid returns to the general circuit through conduit 33.

The gauzes 31 which close a chamber 34 fed with purified fluid are subjected periodically to a mechanical shock due to the rod 10 which acts on the central support 35 of the gauze 31, which support is subjected to the action of a spring 36.

This mechanical shock removes the impurities which are driven away by the fluid of the chamber 34 during the switching of the chambers being cleaned in counter-current, this switching time giving rise to a zero counter-current pressure, all the filters functioning.

This collection of the impurities is not effected by gravity, and the filter may be mounted in any position.

As the impurities are in a separate casing, they may easily be evacuated by an orifice being opened in the casing, even when the apparatus is in operation. There is no longer any need to drain in order to clean the filter, as is the case of known filters where the cleaning oil is returned in the circuit of the oil to be filtered.

The self-cleaning filter shown in FIGS. 5 to 8 comprises the filter constituted of a stack of the filtering elements 1, whose feed orifices 4 are separated from the feed by a rotary obturator 7, controlled by the rod 10 of the piston 14 of a hydraulic motor. The motor comprises the distributor slide 23, which switches the feed from one side to the other of the piston 14 and plunges by its two ends into the chambers 24 and 25 communicating respectively by conduits 40 and 41 with the return circuit 30, a slide 42 actuated by the piston 14 isolating them alternately.

This slide 42, which passes, in sealed manner, through the piston 14, has drive catches 43, 44 by which the piston 14 pushes this slide 42 in order to close the conduit 40 or 41, whilst at the end of stroke, the piston 14 actuates a valve 45 with spring valve 46, which places closed conduit 40 or 41 in communication with a feed conduit 47 or 48. The feed pressure then pushes the slide 23 which establishes the communication between the conduit 47 or 48 and the inside of the chamber 19 of the piston, and which closes the evacuation conduit 49, whilst, on the other side of the piston, the slide 23 places the chamber 19 in communication with an evacuation conduit 50, the conduits 49 and 50 being connected to the return circuit 30.

In this embodiment, the rod 10 is fixed with respect to the piston 14 and it comprises at one end the catch 16 engaged with the ramp 17 made in the central passage 18 of the obturator. This catch is mounted on the rod 10 by the intermediary of a free wheel 51, so as to drive the obturator only in one direction of rotation.

The obturator 7 comprises a groove 52 which is placed opposite the orifices 4 and isolates them from the feed, whilst forming a collector for the liquid for washing in counter-current, which is evacuated both through conduits 5 and through orifices 4 and the collector grooves 52 which communicates with the axial conduit 9 of the rod 10 through a radial orifice 53 opening out into a chamber 54 made between the obturator 7 and the end of the rod 10.

The liquid containing the impurities passes through the conduit 9 and leaves at the other end of the rod 10 through radial conduits 55 which open out into a chamber 56 into which the end of the rod 10 penetrates.

This chamber 56 communicates by conduits 57 with a chamber 58 for retaining impurities, from where the liquid passes through filtering gauzes 59 which retain the impurities, the liquid freed from these impurities evacuating through a conduit 60 towards the general reservoir.

However, the rod 10, in its to and fro movement, leaves chamber 56, this obturating the radial conduits 55, whilst a peripheral groove 61 places a feed conduit 62 in communication with a conduit 63, which sends the liquid in counter-current onto gauzes and removes the impurities which fall into chamber 58 from where they may be evacuated through a drainage stopper 64. It will further be noted, concerning the obturator 7, that the groove is sufficiently wide to cover two orifices 4, this allowing a continuous counter-current washing to be had. Similarly, the obturator is rotated by an angle comprised between the angular distance between two consecutive orifices and the double of this angular distance, this enabling less than eight consecutive advances to be had, for one turn of the obturator, i.e. a more frequent counter-washing to be effected.

Figure 9:
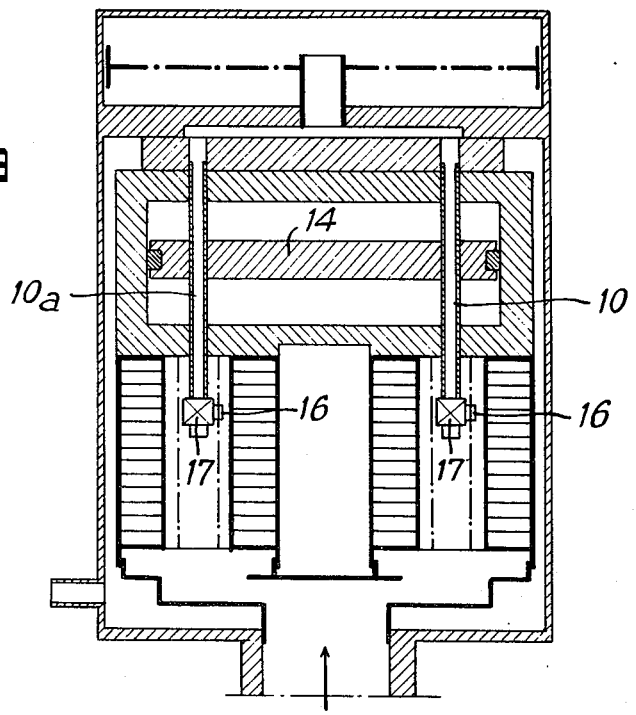
FIG. 9 is a schematic view of a plurality of filters in parallel controlled by a single motor according to the invention.

The embodiment shown schematically in FIG. 9 shows the advantage that there is in mounting the drive catch 16 of the obturator by the intermediary of a free wheel, this allowing a plurality of filters to be coupled in parallel, controlled by the same motor. In this case, the piston 14 comprises a plurality of rods 10–10a, each of which carries a catch 16 mounted on the free wheel 17.

The invention is not limited to the embodiment described and shown, but covers on the contrary, all variants that may be made thereto; in particular, the chamber of impurities may be placed at the end of the filter, symmetrically to the motor, and the hydraulic motor may be coupled to any other type of filter or apparatus.

I claim:

1. A self-cleaning filter which comprises:
   a vessel;
   an inlet conduit means for introducing into said vessel a fluid to be treated;
   a plurality of filtering element means for separating impurities from the fluid being treated, said plurality of filtering element means being disposed parallel to each other within said vessel and forming a series of radially and axially separated filtering chamber each filtering element means having a central passage forming a central passageway within said plurality of filtering element means, each filtering element means having feed orifice means for fluid communication between said inlet conduit means and said filtering chambers;
   a rotary obturator means positioned within said central passageway for successively closing feed orifice means to a series of filtering chambers to permit continuous removal of impurities from such series of filtering chambers when said filter is in an operational mode;
   outlet conduit means for removing impurities from said series of filter chambers;
   outlet conduit means for removing filter fluid from said filtering chambers;
   a control rod disposed for reciprocal and continuous movement in said vessel to actuate said rotary obturator means;
   a hydraulic motor means comprising a piston means disposed for reciprocal movement within a compartment of said vessel and integrally connected to said control rod, said piston means being alternately subjected to the pressure of the fluid being treated on opposite faces thereof;
   a distributor slide means disposed within a distribution chamber including end sub-chambers of said vessel for alternating the flow of fluid to a face of said piston means;
   conduit means for introducing fluid into said distribution chamber;
   a piston drive means for activating said distributor slide means at a terminus of a stroke of said piston means; and
   outlet conduit means for withdrawing filtered fluid from said vessel.

2. A self-cleaning filter as claimed in claim 1 wherein said distributor slide means includes end piston means which closes respectively each end sub-chamber, the end piston means being integrated with each other and the piston drive means alternately pushing one of said end piston means by a slide and a spring means.

3. A self-cleaning filter as claimed in claim 2 wherein said control rod means is formed of a slide actuated by said piston means and a valve of which a spring valve is actuated by said piston means at the end of stroke thereof.

4. A self-cleaning filter as claimed in claim 1 wherein each filtering element means includes a plurality of separate annular chambers, each annular chamber having an outlet conduit means for withdrawing filtered fluid from said filtering element means and an outlet conduit means for counter-current cleaning and wherein said rotary obturator means comprising a helical ramp which engages a finger mounted on said control rod means.

5. A self-cleaning filter as claimed in claim 4 wherein said control rod means is mounted on said piston means by a free wheel permitting the rotation of said control rod means in the piston means for unidirectional axial displacement of said piston means, said control rod means including a non-return catch for unidirectional rotation of said rotary obturator means.

6. A self-cleaning filter as claimed in claim 4 wherein said control rod is hollow and serves as a conduit means for a washing fluid which is passed to a filter means accumulating impurities.

7. A self-cleaning filter as claimed in claim 6 wherein said washing fluid containing impurities is passed to a separate decantation chamber.

8. A self-cleaning filter as claimed in claim 7 wherein said decantation chamber is overlaid by said filter means of an evacuation circuit for said wash fluid, said filter means being subjected to the mechanical action of said control rod to remove by the combined action of mechanical shock and the counter-pressure of a filtered fluid stream.

9. A filter as claimed in claim 1 wherein said washing fluid is passed to a waste chamber having an outlet closed by a filter means which stops said impurities, said filter means being subjected to a washing step controlled by said control rod of said drive piston means.

* * * * *